(12) United States Patent
Wu et al.

(10) Patent No.: US 8,449,656 B2
(45) Date of Patent: May 28, 2013

(54) PROCESS AND APPARATUS FOR REMOVAL OF OXYGEN FROM SEAWATER

(75) Inventors: Kuang-Yeu Wu, Plano, TX (US); Adam T. Lee, Dallas, TX (US); Lindsey Vuong, Allen, TX (US); Edward K. Liu, Houston, TX (US); Karl T. Chuang, Edmonton (CA)

(73) Assignee: AMT International Inc., Plano, TX (US)

( * ) Notice: Subject to any disclaimer, the term of this patent is extended or adjusted under 35 U.S.C. 154(b) by 326 days.

(21) Appl. No.: 12/926,399

(22) Filed: Nov. 16, 2010

(65) Prior Publication Data

US 2012/0118154 A1    May 17, 2012

(51) Int. Cl.
*B01D 19/00* (2006.01)

(52) U.S. Cl.
USPC .................. 95/246; 95/263; 95/265; 95/260; 96/200; 96/201

(58) Field of Classification Search
USPC .............. 95/246, 263, 265, 260; 96/200, 201
See application file for complete search history.

(56) References Cited

U.S. PATENT DOCUMENTS

| | | | | |
|---|---|---|---|---|
| 4,565,634 | A * | 1/1986 | Lydersen | 210/718 |
| 4,612,021 | A * | 9/1986 | Bland et al. | 95/265 |
| 4,752,306 | A * | 6/1988 | Henriksen | 95/245 |
| 4,861,352 | A * | 8/1989 | Cheng | 75/708 |
| 5,006,133 | A * | 4/1991 | Mandrin et al. | 95/258 |
| 6,392,072 | B1 * | 5/2002 | Henriksen | 554/141 |
| 6,830,608 | B1 * | 12/2004 | Peters | 96/272 |
| 6,918,949 | B1 * | 7/2005 | Peters | 95/185 |

FOREIGN PATENT DOCUMENTS

GB    1531537    * 11/1978

* cited by examiner

*Primary Examiner* — Duane Smith
*Assistant Examiner* — Douglas Theisen
(74) *Attorney, Agent, or Firm* — George A. Seaby

(57) ABSTRACT

A process and apparatus is provided for reduction of dissolved oxygen content in seawater from about 8 ppm in the feed seawater to about 10 ppb or less. Significant advantages are achieved by: use of a separator in horizontal alignment to provide high gas-liquid contacting area for separation and de-entrainment within the separator, thereby providing higher throughput; and heating seawater to at least 30° C. and up to 60° C., so as to enhance removal of oxygen from seawater; use of once-through fuel gas as stripping gas and its subsequent combustion for heating the seawater provides for high efficiency and reduction of fouling. The combination of these features allows the amount of residual oxygen in deoxygenated seawater to be reduced to below 10 ppb and as low as 2 ppb.

18 Claims, 7 Drawing Sheets

US 8,449,656 B2

PROCESS AND APPARATUS FOR REMOVAL OF OXYGEN FROM SEAWATER

FIELD OF INVENTION

The present invention relates to an apparatus and process for reducing the dissolved oxygen content in seawater e.g. from about 8 ppm in the feed to about 10 ppb or less in the effluent seawater. In particular, the process addresses the need to reduce the dissolved oxygen content in seawater to be injected at high pressure into an oil reservoir so as to recover oil from that reservoir.

BACKGROUND OF THE INVENTION

Oil reservoirs are being discovered below the sea bed. In several cases, these reservoirs are located at considerable depths, either below deep water or deep below the sea bed or both. Thus access to these reservoirs for the purpose of recovering oil requires use of complex, expensive above-sea oil platforms to locate the reservoirs and to extract oil therefrom.

Oil can be recovered from sub-sea reservoirs using the pressure naturally available at the reservoir. Additional oil can be recovered by injection of seawater at high pressure into the reservoir, thus forcing out additional oil. However, the oxygen dissolved in seawater, the amount of which depends on temperature, causes corrosion of equipment such as the water injection line. Further, a high concentration of oxygen degrades the quality of oil in the reservoir. Thus it is undesirable for dissolved oxygen to be present at naturally occurring levels in seawater injected into the reservoir.

Several approaches have been taken to reduce the amount of oxygen dissolved in seawater, in particular with the view to injection of the deoxygenated seawater into sub-sea oil reservoirs.

Fuel gas stripping using a conventional counter-current gas-liquid contacter is a convenient method for reducing oxygen dissolved in seawater. However, this method requires a large tower and the apparatus has a large footprint. Thus this method is inefficient for use at off-shore platforms where space is at a premium.

Vacuum towers are used for separation of dissolved gases from liquids. Again, this method requires use of at least one large tower. Further, the method has high operating costs.

Oxygen scavengers injected into seawater react with the dissolved oxygen and thereby reduce the oxygen content. However, the chemicals used as scavengers are expensive, and significantly affect the cost of operating a seawater injection system.

Some commercial designs of apparatus for regenerative nitrogen stripping of oxygen from seawater, such as that from Minox described below, may allow the use of less space than that for either fuel gas stripping or vacuum tower methods, and the method incurs lower costs than use of oxygen scavenging compounds. However, use of the method requires incorporation of apparatus and processes for remediation of operating problems that can arise including, for example, foaming and entrainment that cause fouling of the down stream equipment, and so affect performance of the overall process.

Exemplary processes are described in the following patents.

Lydersen in U.S. Pat. No. 4,565,634 (1986) describes use of a vacuum tower to separate dissolved oxygen from seawater. In essence, dissolved gases are desorbed from the seawater under reduced pressure. As shown in the figure of this patent, nitrogen flows downward through the tower cocurrently with the water, acting as a stripping gas, and a gas stream drawn from the bottom of one stage are pressurized to the pressure of the previous stage and reinjected. The net effect is reduction of oxygen content of the seawater drawn from the bottom of the apparatus to about 0.04 ppm (40 ppb). Here and throughout all such values (percent, ppm, ppb) are expressed by weight.

Bland and Palmer in U.S. Pat. No. 4,612,021 (1986) describe a process for reduction of an unwanted gas in a liquid by contacting with another gas. In essence, the second gas serves as a stripping gas, for example for reduction of oxygen in seawater by supplying nitrogen as said seawater is injected into the main gas ejector. In an auxiliary gas ejector, positioned above the main gas ejector in the figure illustrating the apparatus of this patent, dissolution of entrained nitrogen displaces oxygen dissolved in seawater, which is then reacted in a catalytic burner. Make up nitrogen is then provided. The oxygen dissolved in seawater is reduced to about 0.25 ppm (250 ppb).

Henriksen in U.S. Pat. No. 4,752,306 (1988) describes a system in which an inert stripping gas is pumped in turbulent concurrent flow with seawater to remove dissolved oxygen. The resulting gas mixture and liquid are separated, the gas mixture is then treated to remove oxygen, and the stripping gas is then returned to treat more seawater. In this manner, the oxygen dissolved in seawater is reduced to about 0.1 ppm (100 ppb). Again, when nitrogen is the inert stripping gas the efficiency and cost of the process depend on the purity of nitrogen. A distinguishing feature of this process is that nitrogen is purified after use by removal of oxygen in a separate catalytic reaction chamber, identified by numeral 20 in FIG. 1 of '306, before recycling through the process.

Mandrin and Keller in U.S. Pat. No. 5,006,133 (1991) describe a method and apparatus in which a fuel including natural gas is used as both a stripping gas to remove oxygen from seawater and a fuel to be oxidized by said stripped oxygen in a catalytic process. A delivery means is provided for recycling the oxygen depleted stripping gas to the deoxygenator thus reducing the oxygen content of seawater. It is notable that methane in natural gas is not easily oxidized and so methanol or hydrogen is used to initiate the catalytic combustion part of the process. The oxygen dissolved in seawater is reduced thereby to about 10 ppb.

Norinco Co., an Indian firm, disclosed a Minox™ deoxygenation system comprising two separators and a catalytic reactor for reducing the oxygen content of seawater from about 9.1 ppm to about 5.2 ppb. The apparatus is compact and can be used at hazardous and non-hazardous locations through use of suitable enclosures. The Minox™ deoxygenation process comprises a series of stages. Methanol is added to the effluent of the first stage stripping gas stream, and the mixture of gases is heated over a catalyst so that methanol reacts with oxygen to form carbon dioxide and water. The deoxygenated stripping gas is then returned to a second stage for further use. A problem that can occur with the recycle systems of this type is that the catalyst and downstream equipment are prone to fouling from entrained saltwater.

SUMMARY OF THE INVENTION

Introduction

A once-through stripping gas process for removal of dissolved oxygen from seawater is disclosed. A single stage embodiment comprises a combination of a single mixer and a corresponding single separator.

A two stage embodiment comprises two such combinations used in sequence.

In each embodiment, the mixer is operated at a pressure above atmospheric pressure and at least 25 psi greater than that in the separator. Seawater is heated before entering the mixer and then mixed with stripping gas. Since large equipment is involved, it will be appreciated that it would be difficult to include a heater in the mixer. Accordingly, it is preferred to pre-heat the seawater. The mixture then is sprayed into a separator where deoxygenated seawater and gas are separated.

Preferably, in single stage embodiments the pressure in the mixer is about 30 psig and the pressure in the separator is about 100 mmHg. In two stage embodiments, the first mixer preferably is at a pressure about 60 psig, the corresponding separator and the second mixer are at about 30 psig, and the second separator is at about 100 mmHg.

Heating seawater to a temperature in the range from about 30° C. to 60° C. enhances oxygen removal compared to unheated seawater.

The stripping gas can be a combustible gas e.g. light hydrocarbons such as fuel gas(Typical fuel gas compositions include 72% methane, 16% ethane and 12% propane, and 85% methane, 10% ethane and 5% propane) or natural gas, or an inert gas such as nitrogen, or a mixture thereof. Typically, fuel gas and nitrogen are readily available at on-sea platforms for recovery of liquid hydrocarbons from sub-seabed reservoirs. Accordingly, depending on availability and cost at a platform, the stripping gas is selected from fuel gas, nitrogen, or combinations thereof.

When a combustible gas is the stripping gas, effluent gas from the separator is combusted in the heater used to increase the temperature of incoming seawater, so that it is not necessary to purify said fuel gas for reuse. Thus, the stripping gas is once-through, thereby avoiding fouling of downstream equipment.

The effluent seawater of reduced dissolved oxygen content is suitable for injection into sub-seabed oil reservoirs.

BRIEF DESCRIPTION OF THE DRAWINGS

For a more complete understanding of the present invention and for further objects and advantages thereof, reference is made to the following description taken in conjunction with the accompanying drawings.

DETAILED DESCRIPTION OF THE INVENTION

Each of the embodiments has some common characteristics. In each case, the stripping gas is used once through so that there are no operating problems arising from fouling of down stream equipment due to entrained salt.

In the first and second embodiments the stripping gas is an inert gas, and these embodiments will be described for applications in which nitrogen is the stripping gas. The third and fourth embodiments are described for applications in which the stripping gas is light hydrocarbons, and in particular fuel gas. These stripping gases are selected for illustrative purposes as they normally are readily available on platforms for recovery of hydrocarbon resources from sub-seabed reservoirs.

In the first and third embodiments of the apparatus a single stage process is used ie. a combination of a single mixer followed by a single separator. Seawater and stripping gas are mixed in the mixer operated above atmospheric pressure, preferably about 30 psig, and the mixture is separated in a separator operated below atmospheric pressure, preferably about 100 mmHg. In the second and fourth embodiments the apparatus includes two combinations of a mixer followed by a separator, used in sequence for the process. In these embodiments the first mixer is operated at a pressure, preferably about 60 psig, above that of the first separator and the second mixer, preferably about 30 psig, and the second separator is at a pressure below atmospheric, preferably about 100 mmHg.

One or both of purified nitrogen and fuel gas typically will be available at a platform for recovering liquid hydrocarbons from sub-seabed reservoirs. A typical composition of fuel gas has approximately methane 72%, ethane 16%, and propane 12%. The different embodiments of the present invention address use of whichever gases are available at low cost for use as stripping gas. While each of the embodiments is described using a particular stripping gas, it will be recognized that other stripping gases or a mixture of stripping gases may be used without departing from the essence of the invention.

Referring to FIGS. 1 through 4, in the several exemplary embodiments of the apparatus of the present invention, a heater 432 is provided for heating feed seawater 26 to a prescribed temperature between about 30° C. and 60° C. It will be shown below that heating seawater 26 to a temperature in this range improves removal of dissolved oxygen from said seawater 26.

Figure 1:
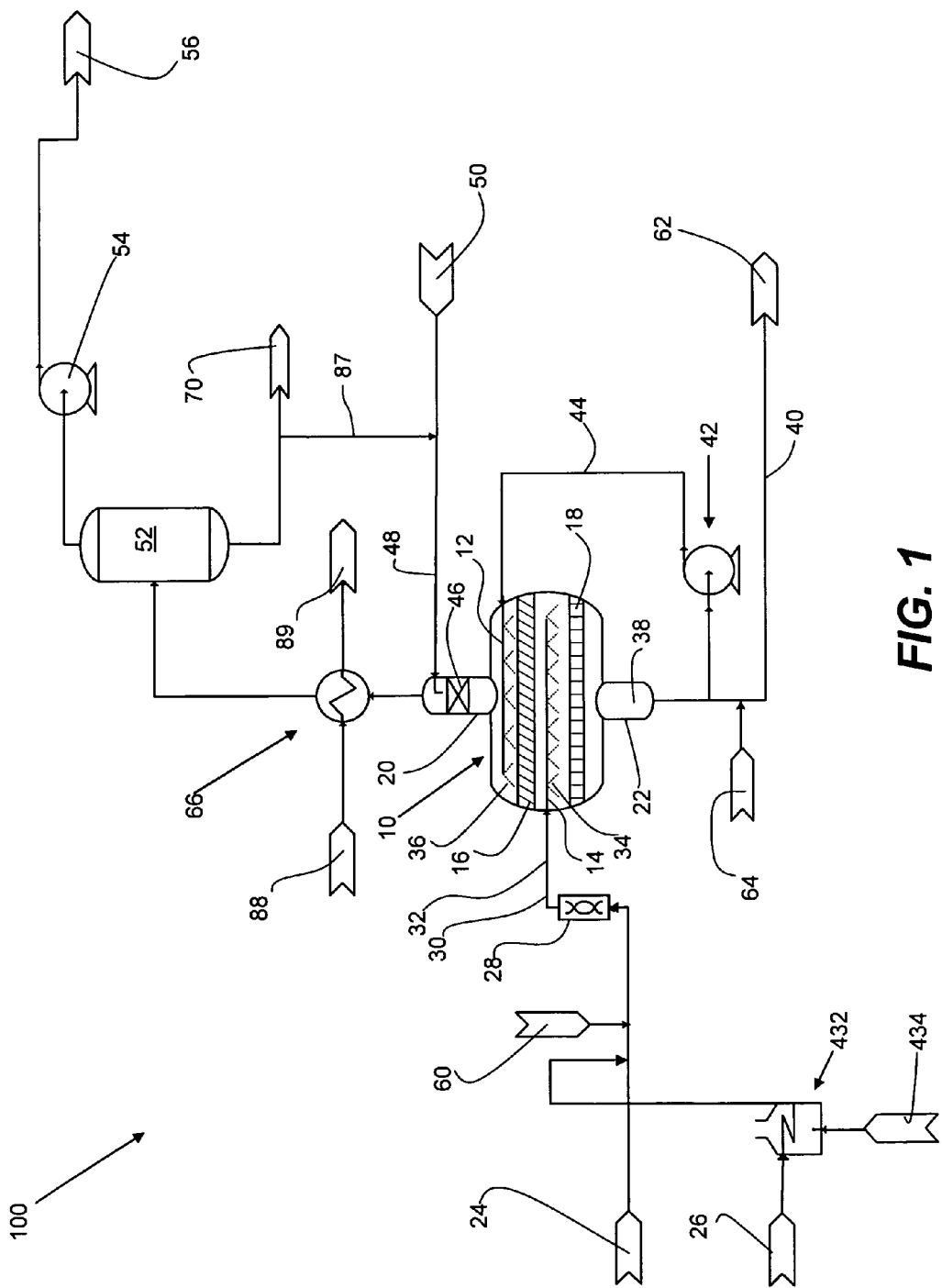
FIG. 1, is a schematic diagram of a first embodiment of the apparatus having a single mixer followed by a single separator for a process using nitrogen as stripping gas for reducing the amount of dissolved oxygen in seawater, wherein the separator is horizontally disposed.

Referring to FIG. 1, a first embodiment of an apparatus 100 for removal of dissolved oxygen from seawater 26 has a single mixer 28 and a single separator 10.

It has been determined that mixer 28 can be a typical bubble column design containing a gas distributor to generate uniformly distributed small bubbles near the bottom of the column. A packing, either random or structured type is installed above the distributor to maintain the uniform bubble distribution and prevent bubble coalescence. A portion of the stripping gas is dissolved into the seawater and the residence time in the mixer is sufficient that the effluent mixture has a composition of liquid having dissolved gas close to that at gas-liquid equilibrium.

Separator 10 has a first distributor 12, a second distributor 14, a first packed bed 16, a second packed bed 18, a gas stream outlet 20 and a liquids outlet 22. Preferably, separator 10 has a horizontal orientation to maximize the available gas-liquid contacting areas of first bed 16 and second bed 18. However, it will be recognized that separator 10 also may have a vertical orientation, and that the same principles of operation will apply in either orientation.

Seawater 26 heated in heater 432 is mixed with stripping gas 24 before passing through mixer 28 to form a mixture 30 (It will be appreciated that both the seawater and the stripping gas can be fed separately into the mixer. However, it is more convenient to mix before entering the mixer.) and is then fed into separator 10. For non-limiting purposes of illustration, in FIG. 1 stripping gas 24 is nitrogen. However, the efficiency of the process and its cost are dependent on the purity of nitrogen used, as will be shown through descriptions of Examples, below. Typically, 97%-99.9% nitrogen is obtained on site using membrane separation processes. However, the higher the nitrogen concentration, the lower is the yield, ie. more expensive for higher nitrogen concentration.

Mixture 30 is fed through line 32 into separator 10 through an inlet at a position intermediate between first bed 16 and second bed 18 and thence into second distributor 14 from which it is sprayed toward second bed 18.

Bed 16 typically comprises multiple layers of high efficiency structured packing or random packing with high surface area per unit packing volume, whereas bed 18 preferably comprises a high void fraction structured packing or grid with lower surface area per unit packing volume.

Mixer 28 is maintained at a pressure that is above atmospheric pressure. The pressure within separator 10 is below atmospheric pressure. It has been found that it is advantageous for operation of the apparatus to maintain the pressure within mixer 28 at about 30 psig, and the pressure within separator 10 at about 100 mm Hg. It also has been found that second distributor 14 operates very effectively to produce an evenly-distributed fine spray 34 when the pressure differential between mixer 28 and separator 10 is about 30 psi.

It should be noted that the pressures and temperatures disclosed in the present invention are exemplary values that provide good performance of the embodiments described. It has been found that the amount of residual oxygen dissolved in seawater is a function of the temperature of the seawater feed that is mixed with stripping gas, the pressure at which the separator is operated, and the stripping gas flow rate. When the temperature is increased or the pressure is decreased, the flow rate of stripping gas required to attain a target level of dissolved oxygen is reduced. The embodiments described herein require relatively lower flow rate of stripping gas because they operate at elevated temperature of seawater feed and separator pressure significantly below atmospheric pressure. The combination of the described temperature and pressure results in the process that can be employed economically using once-through stripping gas.

Optionally, an antifoaming agent 60 can be injected into the fluids flowing into mixer 28.

Within separator 10, mixture 30 is distributed from second distributor 14 as a fine spray 34 that then falls toward second bed 18. Second bed 18 serves to separate mixture 30 into a liquid stream comprising seawater of reduced dissolved oxygen content 38 that descends through second bed 18 and a gas stream containing stripping gas and oxygen, that ascends toward first bed 16.

A majority of effluent seawater 38 is transported via line 40 to seawater injection pumps, indicated by arrow 62, for injection into a sub-sea bed oil reservoir. A minor portion of effluent seawater 38 is taken via a pump 42 and re-injected via line 44 into first distributor 12 to form a fine spray 36 that falls toward first bed 16. First bed 16 serves to de-entrain mist from the gas stream rising above second bed 18 toward first bed 16. Wetting of first bed 16 by spray from first distributor 12 enhances the ability of first bed 16 to de-entrain mist from the rising gas stream.

Although the vast majority of the seawater will be fed onto second bed 18, there could be some inevitable fine mist depending upon spray nozzle pressure drop (finer and more mist at higher pressure differential), which would go up toward first bed 16. For this reason we include a de-entraining section (12+16) to eliminate fresh water entrainment.

Optionally, a small amount of oxygen scavenger 64 can be injected into effluent deoxygenated seawater 38 to further reduce residual traces of oxygen. To ensure efficient oxygen removal from seawater 26, it is desirable that mixture 30 is heated to about 40-55° C., as described below with reference to FIG. 5. To effect optimal contact and rapid mass transfer, distributors 14 and 12 are used to deliver fine droplets of liquid 34 and 36 in separator 10. Means to effect formation of fine droplets are known to those skilled in the art, such as the non-limiting examples described by Peters in U.S. Pat. No. 6,830,608 (2002) and U.S. Pat. No. 6.918,949 (2005). However, the use of such means in combination with beds such as beds 16 and 18 is not described.

Separator 10 includes a third packed bed 46 above which a line 48 supplies fresh water 50 to wet said third bed 46. Third bed 46 serves as a polishing unit to further de-entrain mist in gas stream exiting separator 10, and fresh water 50 washes any saline water collected at third bed 46 and returns it to separator 10. A fraction of water vapor in the gas stream leaving separator 20 is condensed in heat exchanger 66 and removed as liquid water 70 in a gas-liquid separating drum (suction drum) 52 before entering vacuum pump 54. Cooling water 88 is supplied to heat exchanger 66 and the warmed water 89 is sent for disposal. Condensed water 70 also may be sent for disposal. Optionally, a portion of condensed water 70 may be recycled via line 87 to reduce the amount of fresh water 50 required. The reduction of water content from the gas stream reduces the load on pump 54. Vacuum pump 54 serves to maintain the low pressure within separator 10, and sends the gas stream from separator 20 to vent 56 for disposal.

The pressures at the various portions of apparatus 100 are controlled through use of pressure control valves (not illustrated) that control the rates of flow of fluids along the various lines.

Heater 432 is provided to heat the incoming seawater 26 so that the temperature of mixture 30 reaches the prescribed value. Heater 432 typically is operated by combustion of fuel gas 434 before heated seawater 26 is mixed with stripping gas 24.

Figure 2:
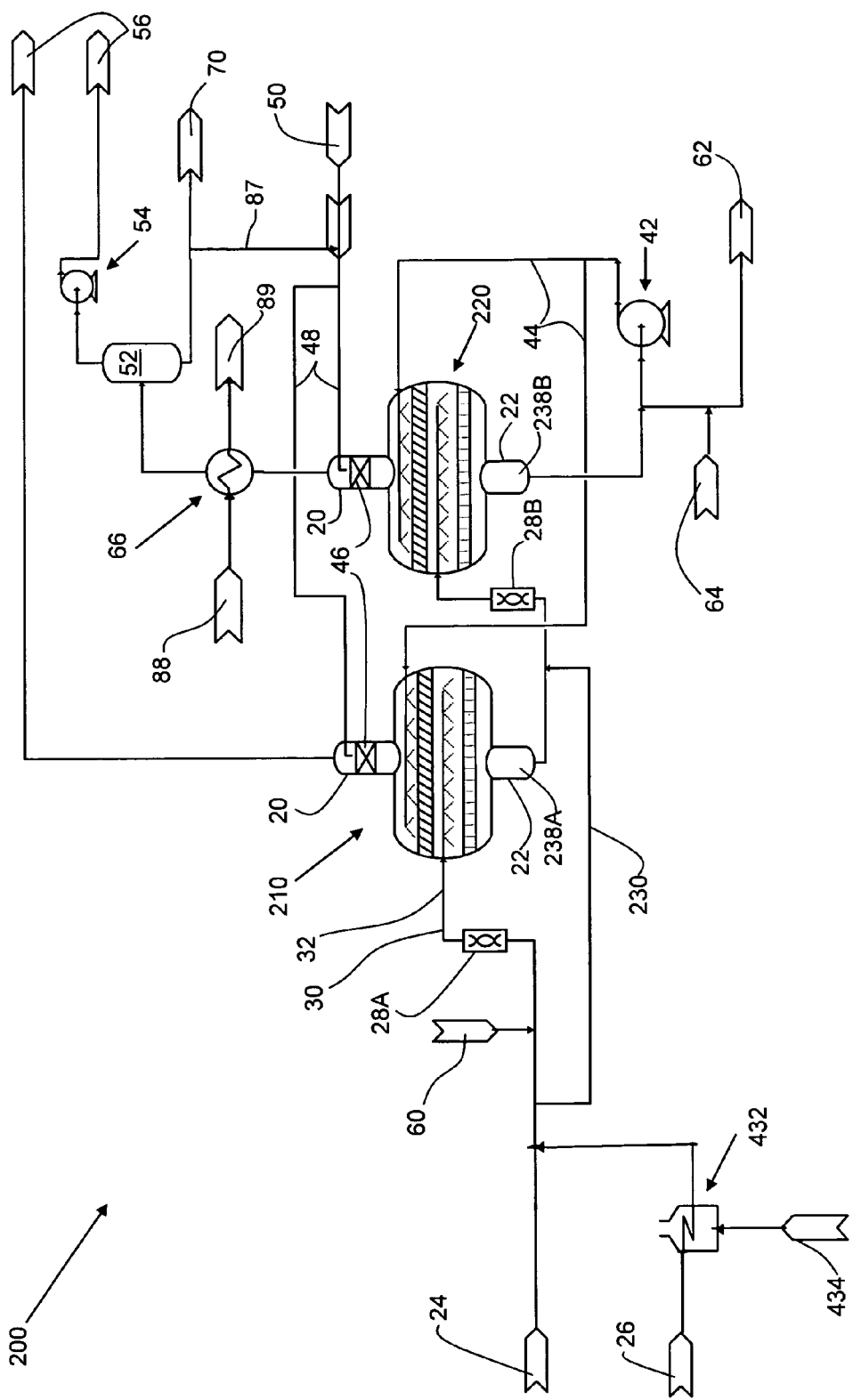
FIG. 2 is a schematic diagram of a second embodiment of the apparatus having two combinations of a mixer followed by a separator, used in sequence for a process using nitrogen as stripping gas for reducing the amount of oxygen dissolved in seawater.

FIG. 2 shows a second embodiment 200 of the apparatus of the present invention, having two separators 210, 220 operating in sequence. The internals of separators 210, 220 are substantially similar in nature and in purpose to those in separator 10 illustrated in FIG. 1. Separator 210 is provided for coarse removal of oxygen from seawater 26, and separator 220 is provided for fine removal of remaining oxygen. Seawater 26 is mixed with stripping gas 24 in mixer 28A and fed to separator 210. Partly deoxygenated seawater 238A and additional stripping gas 24 fed via line 230 are mixed in mixer 28B and fed to separator 220. All other components of second embodiment 200 serve purposes substantially similar to the corresponding components of first embodiment 100 shown in FIG. 1.

It has been found that second embodiment 200 operates efficiently and effectively for removal of oxygen from seawater 26 when mixer 28A is at a pressure about 60 psig, separator 210 and mixer 28B are about 30 psig, and separator 220 is at a pressure about 100 mmHg.

Figure 3:
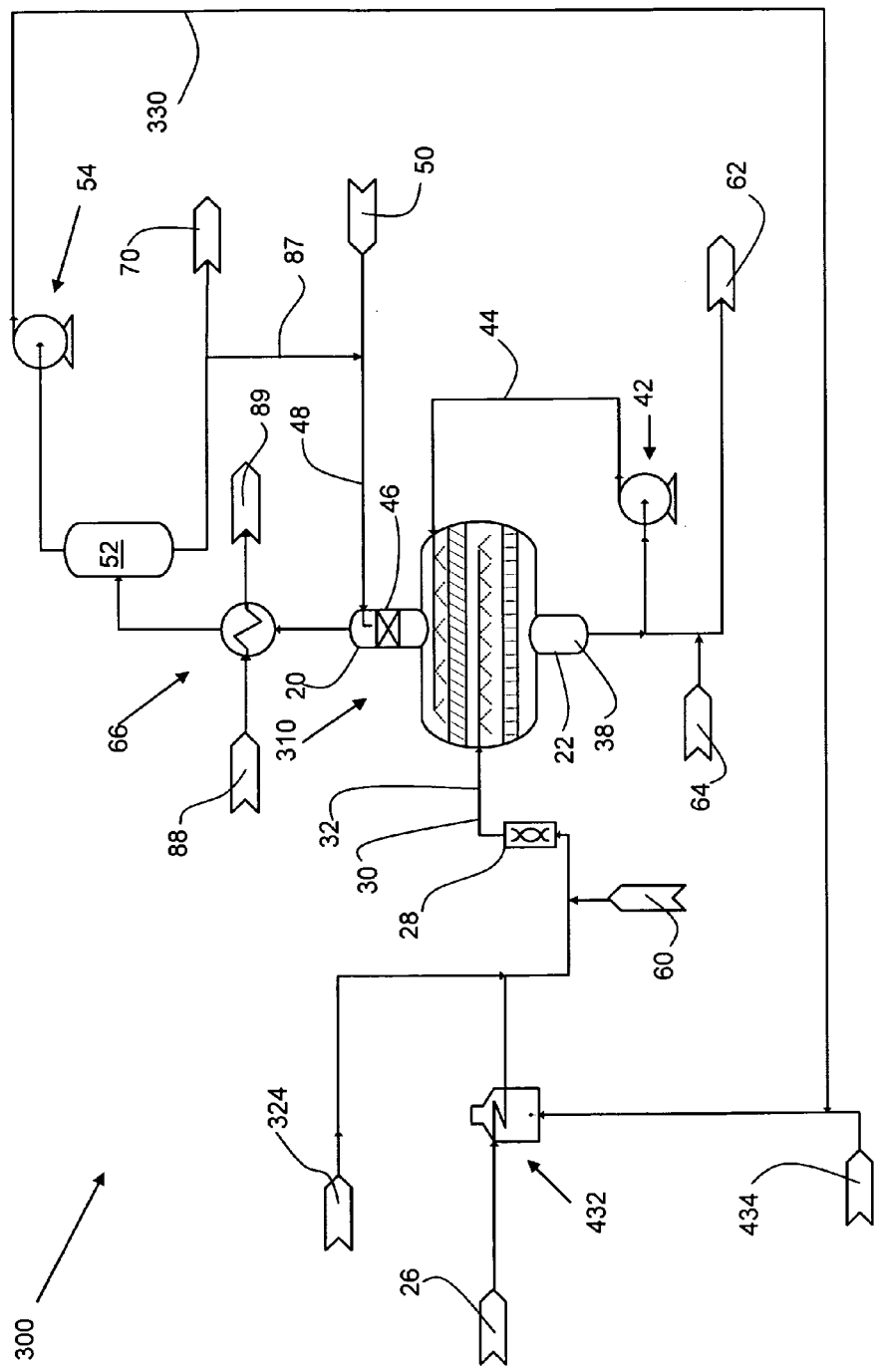
FIG. 3 is a schematic diagram of a third embodiment of the apparatus having one mixer followed by one separator for a process using fuel gas as stripping gas for reducing the amount of oxygen dissolved in seawater.
Figure 4:
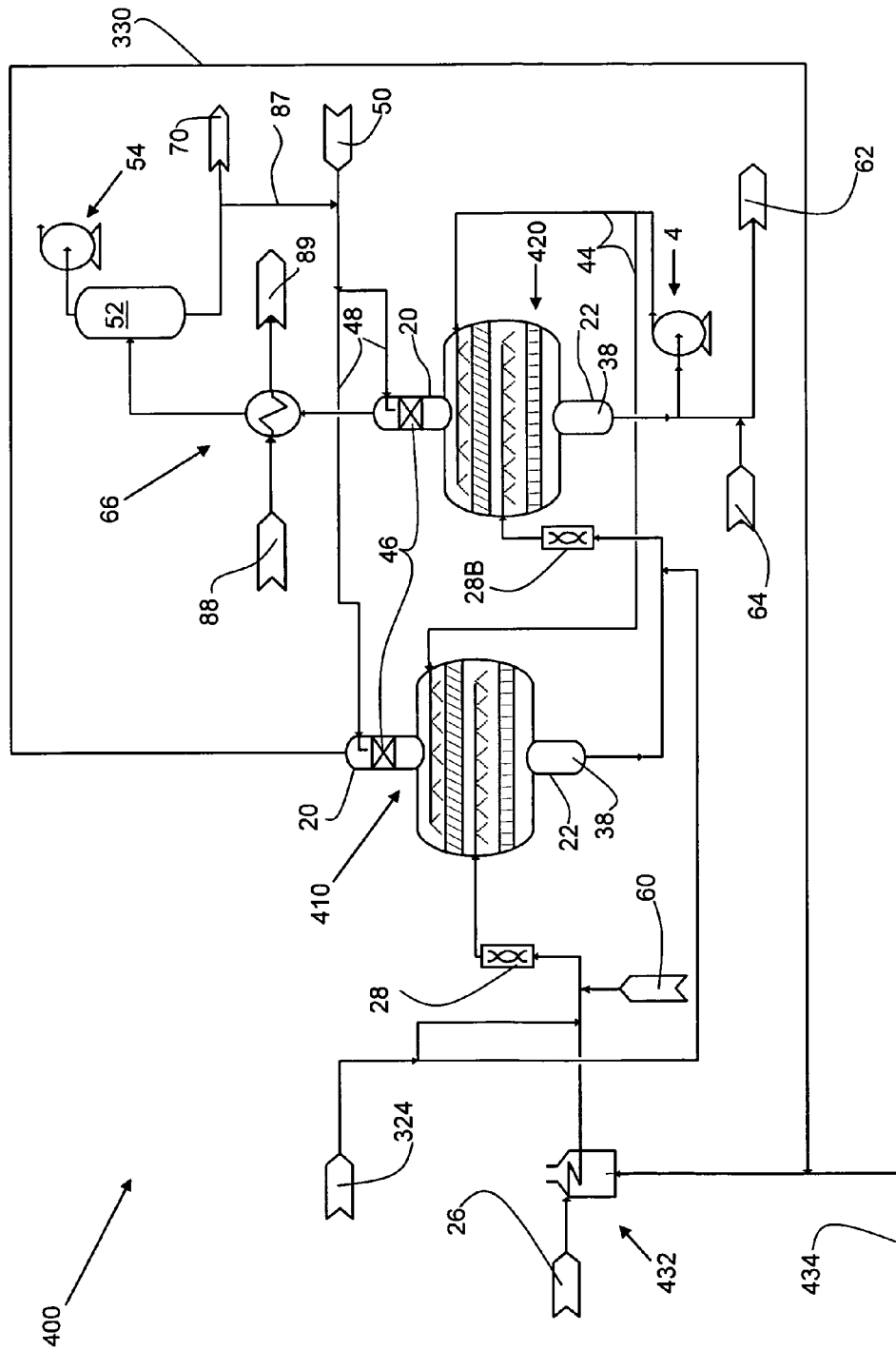
FIG. 4 is a schematic diagram of a fourth embodiment of the apparatus having two combinations of a mixer followed by a separator, used in sequence for a process using fuel gas as stripping gas for reducing the amount of oxygen dissolved in seawater.

FIG. 3 and FIG. 4 show respectively a third embodiment 300 and a fourth embodiment 400 of the apparatus of the present invention. In both third embodiment 300 and fourth embodiment 400 the stripping gas 324 is fuel gas, normally available at a platform for undersea drilling, said fuel gas 324 typically comprising about 72% methane, 16% ethane and 12% propane. Third embodiment 300 has one separator 310 following corresponding mixer 28, and fourth embodiment 400 has two separators 410, 420, following the corresponding mixers 28, 28B, each separator being essentially similar in components and in function to separator 10 of first embodiment 100, illustrated in FIG. 1. Also, the operating pressures of mixer 28 and separator 310 in FIG. 3 are substantially similar to those for mixer 28 and separator 10 of first embodiment 100. Similarly, operating pressures for mixers 28, 28B and separators 410, 420 illustrated in FIG. 4, are substantially similar to those described for mixers 28 28B and separators 210, 220 of second embodiment 200.

Referring to FIGS. 3 and 4, gas removed from separator 310 (FIGS. 3) and 420 (FIG. 4) includes both oxygen stripped from seawater 26 and stripping fuel gas 324. The gas stream from vacuum pump 54 is not vented; instead, it is fed via line 330 toward heater 432. Supplemental fuel gas 434 may be added so that heater 432 heats seawater 26 to a prescribed temperature. The prescribed temperature preferably is between 40° C. and 60° C., and most preferably between 45° C. and 55° C. If required, the temperature to which seawater 26 is heated in heater 432 also can be controlled by the stripping gas that is a mixture of fuel gas and nitrogen.

Figure 5A:
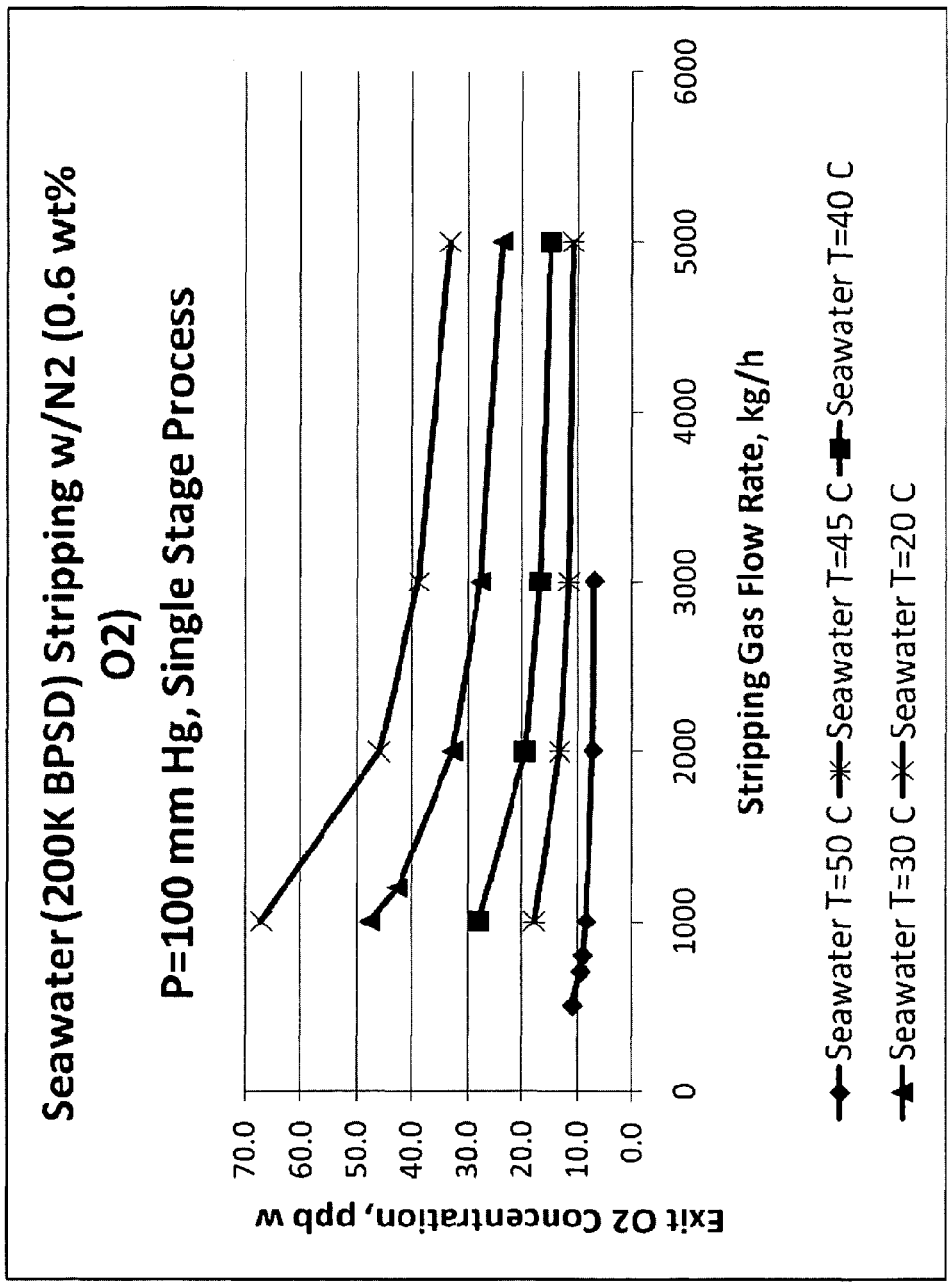
FIG. 5 shows the relationship of gas stripping rate to temperature for two different stripping gases, nitrogen and fuel gas.
Figure 5B:
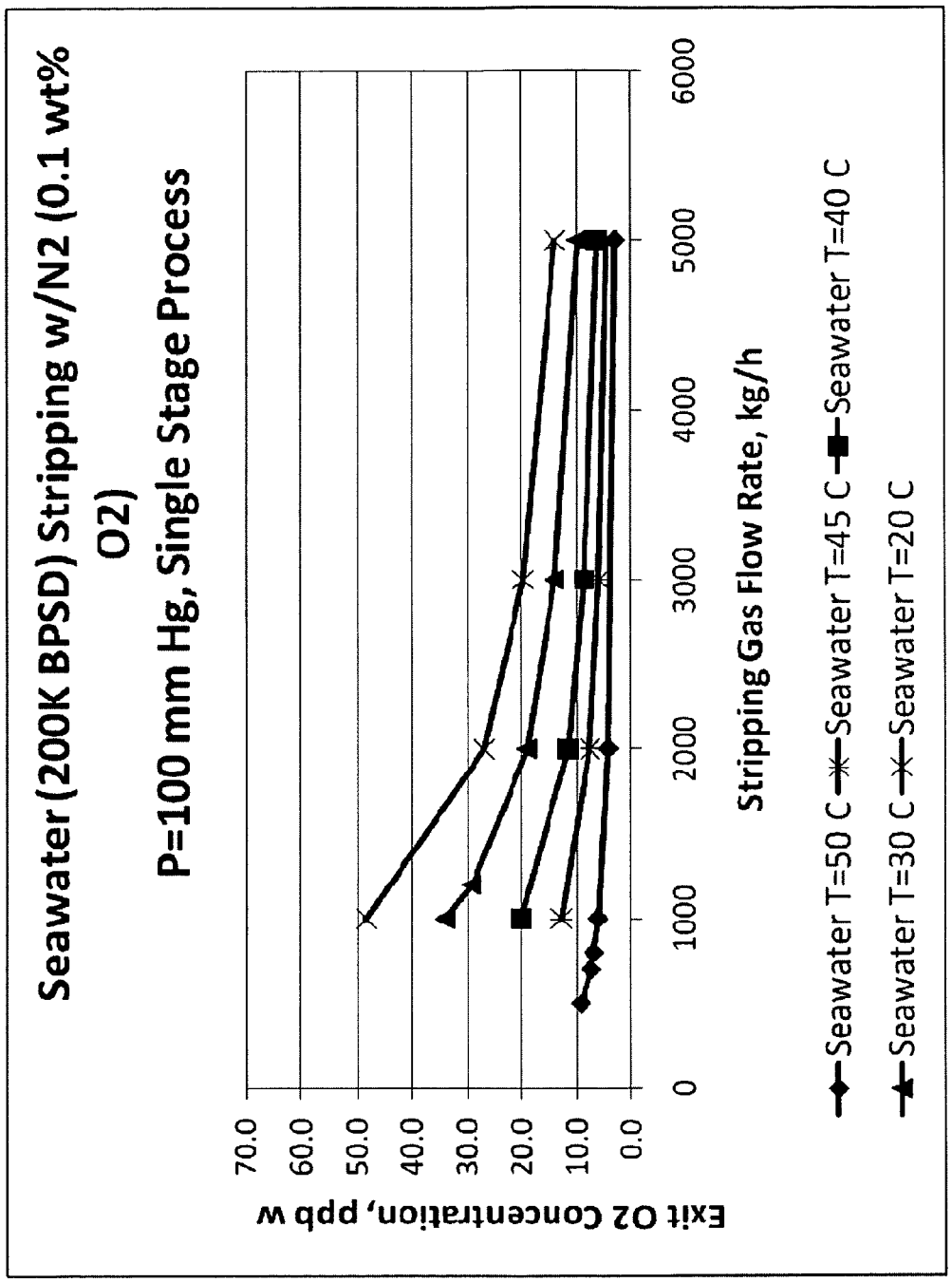
Figure 5C:
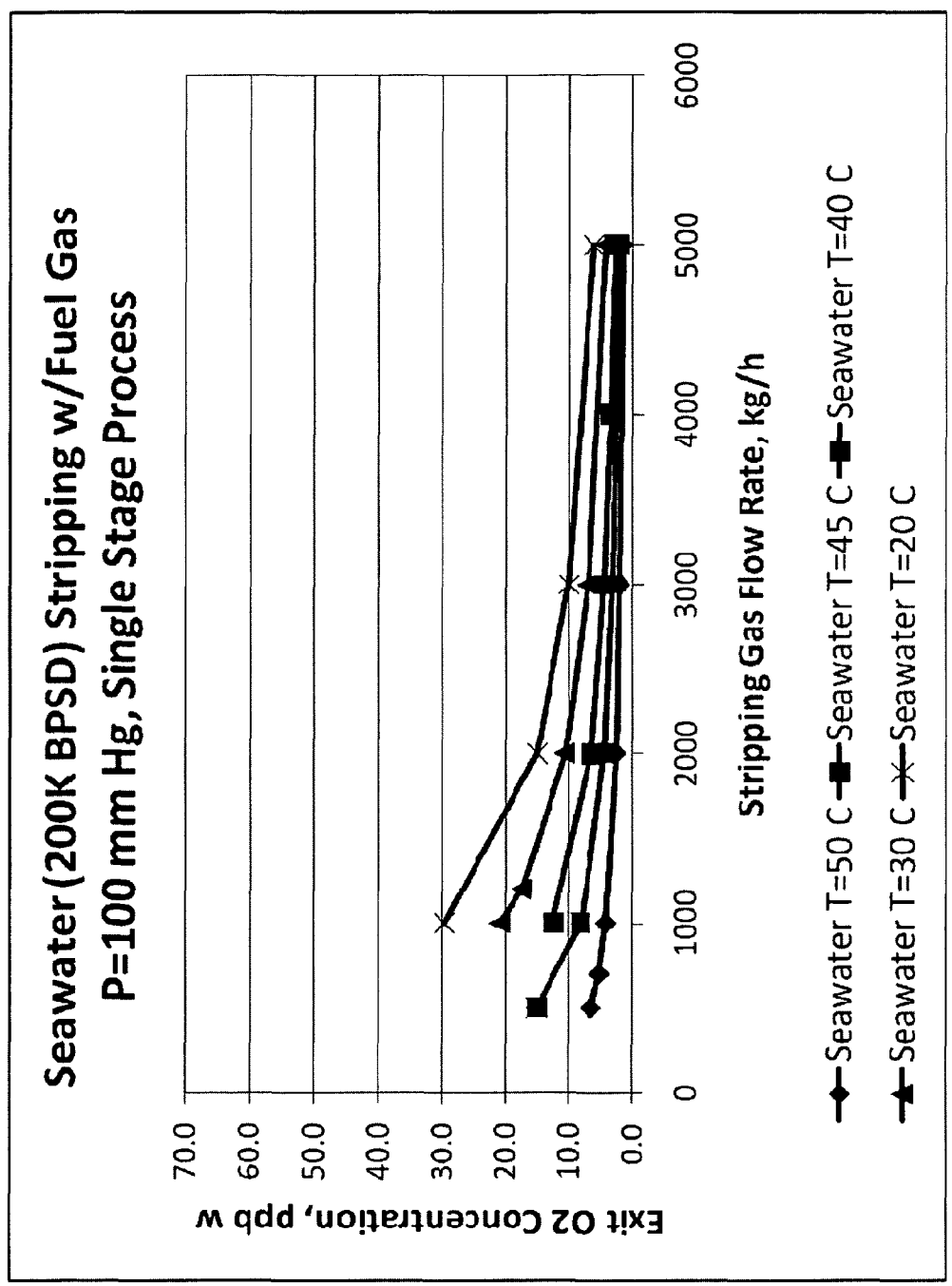

The advantage of preheating seawater 26 before mixing with stripping gas 24 or 324 in a mixer will now be described. FIGS. 5A, 5B and 5C show the relationship between temperature and rate of deoxygenation of seawater at flow rates up to 5000 kg/h stripping gas for a total seawater mass flow rate at about 1,320,000 kg/h (equivalent to 200 k barrels per day ie in the single stage embodiment). In each case the pressure within the separator is maintained at 100 mm Hg. FIG. 5A shows the residual oxygen dissolved in seawater after stripping using nitrogen containing 0.6% oxygen. FIG. 5B shows the improvement that can be effected using nitrogen purified so that it contains only 0.1% oxygen. FIG. 5C shows the superior performance that is attainable from use of fuel gas as stripping gas. In all cases, the rate of oxygen removal from seawater increases with increasing temperature. It is noteworthy that the target of 10 ppb residual oxygen dissolved in seawater is achieved with each stripping gas at 50 °C. Further, the target is surpassed considerably at very high stripping gas flow rates. For use of nitrogen containing 0.1% oxygen the minimum acceptable residual oxygen level, 10 ppb, is achieved only at very high flow rates, whereas with fuel gas as stripping gas very low levels of residual oxygen, to about 2 ppb, are achieved at lower, very moderate stripping gas flow rates.

To minimize effects of corrosion of the pipes and reduction of the quality of oil in reservoirs, it is highly desirable that the oxygen content of seawater to be injected into sub-seabed oil reservoirs is below 10 ppb. FIG. 5 shows that this low concentration is attainable using each embodiment of the apparatus of the present invention. However, deoxygenation of seawater with nitrogen containing 0.6% oxygen requires both high temperatures, at least 50° C., or very high flow rates of stripping gas, or both (FIG. 5A). When the nitrogen stripping gas contains a lower initial amount of oxygen, 0.1%, residual oxygen can be reduced to below 10 ppb at temperatures above 40° C. and, at 50° C. it can be achieved at low stripping gas flow rates (FIG. 5B). FIG. 5C shows that use of a mixture of light hydrocarbons, such as fuel gas of a composition comprising 85%/w methane, 10%/w of ethane and 5%/w of propane, enables reduction to very much lower amounts of residual oxygen at temperatures above about 30° C. and at very much smaller stripping gas flow rates than with nitrogen.

Typically, one or both of purified nitrogen and fuel gas are available at platforms for recovering liquid hydrocarbons from sub-seabed reservoirs. The different embodiments of the present invention address use of whichever is available at low cost for use as stripping gas. When the stripping gas is fuel gas, it may be combusted in the heater to heat the incoming seawater before entering the mixer. Optionally, a mixture of fuel gas and nitrogen may be used as stripping gas, and the effluent mixture containing fuel gas can be fed to the heater. In each case, use of the stripping gas once-through makes it unnecessary to purify said stripping gas for reuse. Further, because the stripping gas is used once-through, fouling of downstream equipment is either reduced considerably or avoided.

Data comparing the operating parameters for different embodiments of the invention and the quality of the stripping gas are presented in the Examples below.

Therefore there are significant advantages to using the present invention, none of which have been realized using the prior art:

Use of a separator in horizontal alignment provides higher gas-liquid interfacial area to facilitate separation and de-entrainment, and thus provides higher throughput. It will be apparent that vertical columns may be used for lower flow cases, and where space availability is a consideration.

Heating seawater before entering the gas-liquid mixer increases the extent of deoxygenation of said seawater, to a temperature between about 30° C. and 60° C. and, for efficient and safe operation, preferably between 45° C. and 55° C.

While the stripping gas is selected from fuel gas, an inert gas such as nitrogen, and a mixture thereof, a mixture may be preferred when nitrogen is available at low cost. The fuel gas is used once-through and then combusted in the heater to provide heat for increasing seawater temperature before entering the mixer. The ratio of nitrogen to fuel gas is chosen so that the stripping gas is combustible in the air, and fuel gas concentration is chosen so that there is sufficient heat to arrive at the optimum seawater temperature. When there is excess fuel gas it can be vented.

When there is combination of a single mixer and a single separator, the pressure in the mixer is above one atmosphere, preferably about 30 psig, and the pressure in the separator is below one atmosphere, preferably about 100 mmHg. When there are two successive combinations of a mixer and a corresponding separator, the pressure differentials between the respective combinations of mixer and separator each are about 30 psi.

The combination of these features allows the amount of residual oxygen in deoxygenated seawater to be reduced to a very low levels, typically below 10 ppb and as low as 2 ppb.

It will be recognized that the embodiments described can be modified without affecting the spirit of the present invention, and so the descriptions are presented for purpose of illustrating the process and apparatus of the present invention without limitation.

EXAMPLES

Example 1

In a first case, seawater is deoxygenated in an apparatus having a single mixer and a single separator, as illustrated in FIG. 1. The feed and effluent flow rates are as shown in Table 1. The oxygen concentration in the deoxygenated seawater recovered from the apparatus is below 10 ppb.

The naturally occurring concentration of nitrogen dissolved in seawater is about 12 ppm, depending on temperature. It will be recognized that the concentration of nitrogen in seawater will change after heating and mixing with stripping gas. However, the change in concentration of nitrogen does not affect significantly the data presented below.

TABLE 1

Deoxygenation of seawater using 99.9% $N_2$ as stripping gas at higher flow rate.

| Stream: | | Seawater feed | Nitrogen feed | Mixture of seawater and stripping gas | Effluent gas stream from separator | Effluent liquid stream from separator |
|---|---|---|---|---|---|---|
| Phase: | | Liquid | Gas | Mixed | Gas | Liquid |
| Temperature: | ° C. | 45.0 | 45.0 | 45.0 | 43.8 | 43.8 |
| Pressure: | kg/cm$^2$ | 4.0 | 4.0 | 4.0 | 0.136 | 0.136 |
| Liquid density: | kg/m$^3$ | 987.3 | | 987.3 | | 987.9 |
| Mass flow rate: | kg/h | 1,324,464 | 2,000 | 1,326,464 | 4,756 | 1,321,708 |
| Compositions, mass percent: | | | | | | |
| Water: | | 99.9980 | 0 | 99.8472 | 57.4070 | 100 |
| Oxygen: | | 0.0008 | 0.1142 | 0.0010 | 0.2706 | <10 ppb |

Example 2

In a second case, seawater is deoxygenated under the same conditions but at a lower flow rate of both seawater and nitrogen as stripping gas. It is seen from Table 2 that the compositions of the various streams are unchanged when compared to Example 1.

TABLE 2

Deoxygenation of seawater using 99.9% $N_2$ as stripping gas at lower flow rate.

| Stream: | | Seawater feed | Nitrogen feed | Mixture of seawater and stripping gas | Effluent gas stream from separator | Effluent liquid stream from separator |
|---|---|---|---|---|---|---|
| Phase: | | Liquid | Gas | Mixed | Gas | Liquid |
| Temperature: | ° C. | 45.0 | 45.0 | 45.0 | 43.8 | 43.8 |
| Pressure: | kg/cm$^2$ | 4.0 | 4.0 | 4.0 | 0.136 | 0.136 |
| Liquid density: | kg/m$^3$ | 987.3 | | 987.3 | | 987.9 |
| Mass flow rate: | kg/h | 662,232 | 1,000 | 663,232 | 2,378 | 660854 |
| Compositions, mass percent: | | | | | | |
| Water: | | 99.9980 | 0 | 99.8472 | 57.4070 | 100 |
| Oxygen: | | 0.0008 | 0.1142 | 0.0010 | 0.2706 | <10 ppb |

Example 3

In a third case, seawater is deoxygenated in an apparatus having in sequence a first mixer, a first separator, a second mixer and a second separator, as illustrated in FIG. 2. The stripping gas is 99.4% nitrogen containing 0.6% oxygen. The feed and effluent flow rates are as shown in Table 3. It is seen that use of lower purity nitrogen as stripping gas requires use of a sequence of two combinations of mixer and separator to reduce the oxygen content of seawater below 10 ppb.

TABLE 3

Deoxygenation of seawater using 99.4% $N_2$ as stripping gas in an apparatus having two combinations of a mixer and a separator in sequence.

| Stream: | Seawater feed | Nitrogen feed to first mixer | Mixture of seawater and stripping gas from first mixer | Effluent gas stream from first separator | Effluent liquid stream from first separator | Nitrogen feed to second mixer | Mixture of seawater and stripping gas from second mixer | Effluent gas stream from second separator | Effluent liquid stream from first separator |
|---|---|---|---|---|---|---|---|---|---|
| Phase: | Liquid | Gas | Mixed | Gas | Liquid | Gas | Mixed | Gas | Liquid |
| Temp.: ° C. | 45.0 | 45.0 | 45.0 | 45.0 | 45.0 | 45.0 | 44.9 | 44.1 | 44.1 |
| Pressure: kg/cm$^2$ | 4.0 | 4.0 | 4.0 | 1.55 | 1.55 | 4.0 | 1.55 | 0.136 | 0.136 |
| Liquid density: kg/m$^3$ | 987.3 | | 987.3 | | 987.3 | | 987.3 | | 987.7 |
| Mass flow rate: kg/h | 662,232 | 700 | 662,932 | 729 | 662,203 | 700 | 662,903 | 1,722 | 661,181 |

TABLE 3-continued

Deoxygenation of seawater using 99.4% $N_2$ as stripping gas in an apparatus having two combinations of a mixer and a separator in sequence.

| Stream: | Seawater feed | Nitrogen feed to first mixer | Mixture of seawater and stripping gas from first mixer | Effluent gas stream from first separator | Effluent liquid stream from first separator | Nitrogen feed to second mixer | Mixture of seawater and stripping gas from second mixer | Effluent gas stream from second separator | Effluent liquid stream from first separator |
|---|---|---|---|---|---|---|---|---|---|
| | | | | Compositions, mass percent: | | | | | |
| Water: | 99.9980 | 0 | 99.8924 | 4.1418 | 99.9978 | 0 | 99.8923 | 58.5328 | 100 |
| Oxygen: | 0.0008 | 0.5707 | 0.0014 | 1.2289 | 0.0001 | 0.5707 | 0.0007 | 0.2511 | <10 ppb |

Reference Cited

| U.S. Patent Documents | | | |
|---|---|---|---|
| 4,565,634 | January 1986 | Lydersen | 210/718 |
| 4,612,021 | September 1986 | Bland et al. | 55/53 |
| 4,752,306 | June 1988 | Henriksen | 55/38 |
| 5,006,133 | April 1991 | Mandrin et al. | 55/53 |
| 6,392,072 | May 2002 | Henriksen | 554/141 |
| 6,830,608 | December 2004 | Peters | 96/272 |
| 6,918,949 | July 2005 | Peters | 95/185 |

The invention claimed is:

1. A once-through process for reducing the amount of dissolved oxygen in seawater comprising
   (a) heating seawater to a temperature in the range from about 30° C. to 60° C.;
   (b) in a mixer maintained at a pressure above atmospheric pressure, mixing the heated seawater with a stripping gas to form a mixture, wherein the content of stripping gas dissolved in the heated seawater is at a concentration close to the equilibrium value at the temperature of the mixer;
   (c) feeding the mixture of heated seawater and stripping gas from the mixer to a separator operated at a pressure below that of the corresponding mixer, to provide a gas stream and a liquid stream comprising seawater of reduced dissolved oxygen content, wherein the temperature of the seawater and the flow rates of the seawater and stripping gas are selected to reduce the dissolved oxygen content in the seawater to a preselected value.

2. The process of claim 1, wherein the mixture is sprayed onto a packed bed in the separator, to separate a gas stream containing stripping gas and oxygen from a liquid stream comprising seawater of reduced dissolved oxygen content.

3. The process of claim 2, wherein the mixer and separator comprise a single mixer and a single separator, wherein the mixer is operated at above atmospheric pressure and the separator is operated at sub-atmospheric pressure, so that the pressure differential between the mixer and the separator is about 30 psi.

4. The process of claim 3, wherein the stripping gas is selected from the group consisting of a fuel gas, natural gas, nitrogen and a mixture thereof.

5. The process of claim 4, wherein in the mixer, the pressure is about 30 psi and the pressure in the separator is about 100 mm Hg.

6. The process of claim 1, wherein the seawater is heated to a temperature from about 40° C. to about 55° C.

7. The process of claim 6, wherein the stripping gas is selected from the group consisting of a fuel gas, natural gas, nitrogen and a mixture thereof.

8. The process of claim 1, wherein the mixer and separator comprise in sequence a first mixer, a first separator, a second mixer and a second separator, the combination of first mixer and first separator serving to reduce the amount of oxygen dissolved in the heated seawater, and the combination of the second mixer and the second distributor serving to further reduce said amount of dissolved oxygen.

9. The process of claim 8, wherein, the mixture is sprayed onto a packed bed in both the first and second separators, to separate a gas stream containing stripping gas and oxygen from a liquid stream comprising seawater of reduced dissolved oxygen content.

10. The process of claim 9, wherein the first mixer is operated at a pressure about 60 psig, the first separator and the second mixer are operated at a pressure about 30 psig, and the second separator is operated at a pressure of about 100 mm Hg.

11. An apparatus for reducing the amount of dissolved oxygen in seawater, comprising:
    a heater for heating seawater to a temperature of in the range from about 30° C. to 60° C.,
    a mixer maintained at a pressure above atmospheric pressure for mixing seawater and a stripping gas, and a
    separator for separating a liquid stream comprising seawater of reduced dissolved oxygen content from a gaseous stream containing stripping gas, the separator being operated at a pressure below that of the mixer.

12. The apparatus of claim 11, wherein the separator includes a distributor for spraying the mixture onto a packed bed to separate a gas stream containing the stripping gas and oxygen from a liquid stream comprising seawater of reduced dissolved oxygen content.

13. The apparatus of claim 12, wherein the mixer and separator comprise a single mixer and a single separator, wherein the mixer is operated at above atmospheric pressure and the separator is operated at sub-atmospheric pressure, so that the pressure differential between the mixer and the separator is about 30 psi.

14. The apparatus of claim 11, wherein the mixer and separator comprise in sequence a first mixer, a first separator, a second mixer and a second separator, the combination of first mixer and first separator serving to reduce the amount of oxygen dissolved in the heated seawater, and the combination of the second mixer and the second separator serving to further reduce said amount of dissolved oxygen.

15. The apparatus of claim 14, wherein each of the first and second separators includes a distributor for spraying the mixture onto a packed bed to separate a gas stream containing the stripping gas and oxygen from a liquid stream comprising seawater of reduced dissolved oxygen content.

16. The apparatus of claim 11, wherein the separator comprises a body, including
    a first distributor,
    a second distributor,
    a first packed bed situated between the first distributor and the second distributor,
    a second packed bed below the second distributor, a gas stream outlet situated above the first distributor, a liquid stream outlet below the second packed bed, an inlet between the first bed and the second bed for supplying a mixture of seawater and stripping gas from the mixer, the mixture being fed into the second distributor from which it is sprayed toward the second packed bed, where it is separated into a liquid stream containing seawater of reduced dissolved oxygen content which descends through the second packed bed, and a gas stream that ascends toward the first bed, wherein a major portion of the liquid stream exiting the liquid outlet is removed as effluent and a minor portion of the liquid stream exiting the liquid outlet is re-injected into the separator and into the first distributor to form a spray that falls toward the first packed bed, the first packed bed serving to de-entrain mist from the gas stream rising above the second packed bed toward the first packed bed.

17. The apparatus of claim 16, wherein the separator is disposed in a horizontal orientation.

18. The apparatus of claim 17, wherein the first packed bed comprises multiple layers of high efficiency structured packing or random packing with high surface area per unit packing volume, and the second packed bed comprises a high void fraction structured packing or grid with lower surface area per unit packing volume.

* * * * *